United States Patent
Naveen et al.

(10) Patent No.: US 6,882,746 B1
(45) Date of Patent: Apr. 19, 2005

(54) NORMALIZED BITMAP REPRESENTATION OF VISUAL OBJECT'S SHAPE FOR SEARCH/QUERY/FILTERING APPLICATIONS

(75) Inventors: Thumpudi Naveen, Redmond, WA (US); Anil M. Murching, Beaverton, OR (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/495,597

(22) Filed: Feb. 1, 2000

Related U.S. Application Data

(60) Provisional application No. 60/118,207, filed on Feb. 1, 1999, now abandoned.

(51) Int. Cl.[7] .................................................. G06K 9/34
(52) U.S. Cl. ........................ 382/173; 382/291; 382/293; 382/305; 707/104.1
(58) Field of Search ................................ 382/293, 291, 382/294–296, 305, 173–180, 155–161, 190; 707/3–6, 104, 1

(56) References Cited

U.S. PATENT DOCUMENTS

| | | | | |
|---|---|---|---|---|
| 5,751,286 A | * | 5/1998 | Barber et al. ................ 345/835 |
| 5,774,129 A | * | 6/1998 | Poggio et al. ............... 345/441 |
| 5,784,501 A | * | 7/1998 | Tanaka ........................ 382/286 |
| 5,852,823 A | * | 12/1998 | De Bonet ....................... 707/6 |
| 6,002,794 A | * | 12/1999 | Bonneau et al. ............. 382/166 |
| 6,088,483 A | * | 7/2000 | Nakano et al. .............. 382/209 |
| 6,181,817 B1 | * | 1/2001 | Zabih et al. ................. 382/170 |
| 6,192,150 B1 | * | 2/2001 | Leow et al. .................. 382/190 |
| 6,266,442 B1 | * | 7/2001 | Laumeyer et al. ........... 382/190 |
| 6,292,575 B1 | * | 9/2001 | Bortolussi et al. ........... 382/118 |
| 6,415,282 B1 | * | 7/2002 | Mukherjea et al. ............. 707/3 |

* cited by examiner

*Primary Examiner*—Bhavesh M. Mehta
*Assistant Examiner*—Aaron Carter
(74) *Attorney, Agent, or Firm*—Joseph S. Tripoli; Ronald H. Kurdyla; Joel M. Fogelson

(57) ABSTRACT

A method of generating normalized bitmap representation for the shape of a visual object for use in search/query/filtering applications segments an image into visual objects. The samples belonging to a visual object of interest are identified. The identified samples that form the largest connected blob are reduced to an un-normalized bitmap. The un-normalized bitmap is then normalized using the mean and covariance of the valid samples to generate the normalized bitmap representation having a standard height and having an orientation such that a principal direction is along a vertical direction. The normalized bitmap representation may be used with a query to search a database of images where the visual objects all have associated normalized bitmap representations. The query bitmap is normalized and matched to each normalized bitmap representation. The visual objects having the lowest mismatch values of their normalized bitmap representation with the query bitmap are identified as the objects of the search.

5 Claims, 4 Drawing Sheets

Generation of 4 versions of query shape

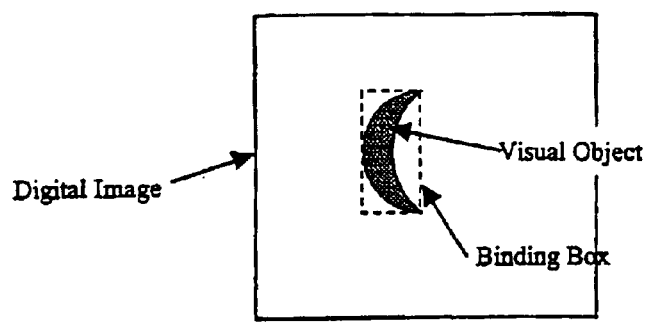
Figure 1 A Visual Object, and its Binding Box
Figure 2 A bitmap representing the object shape in previous figure
Figure 3 An Unnormalized Bitmap

Figure 4 Normalized Bitmap
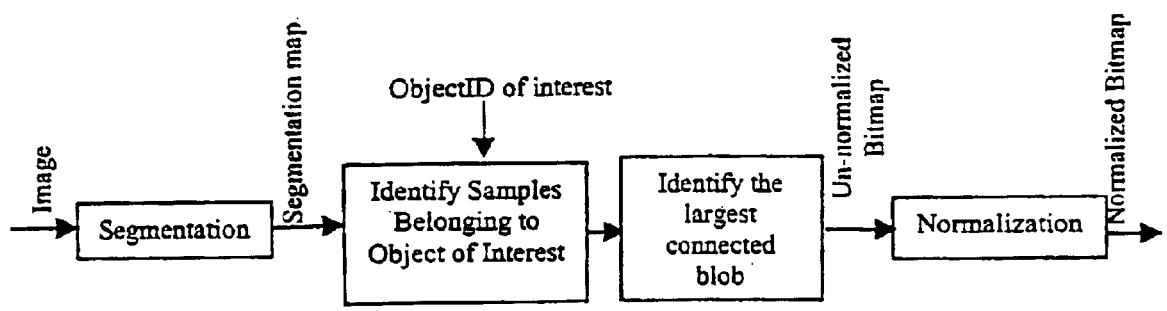
Figure 5 Overall Normalized Bitmap Generation
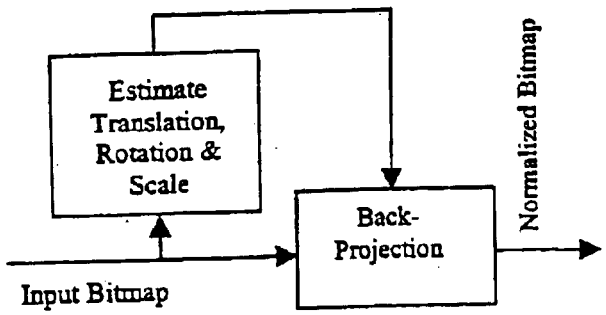
Figure 6 Bitmap Normalization Process

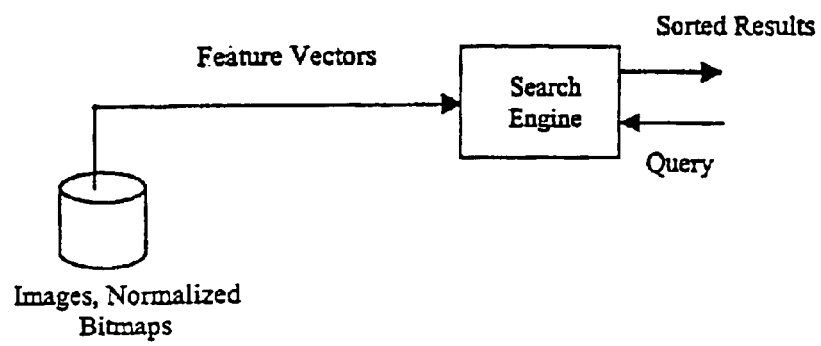
Figure 7 Search Engine based on normalized bitmap representation of shape
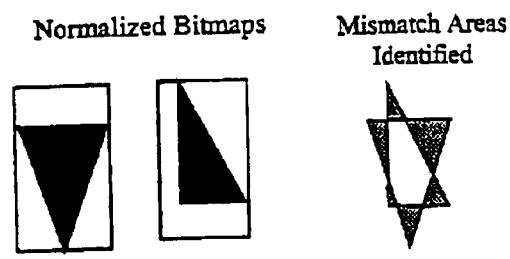
Figure 8 Mismatch measure is the number of samples in the gray region

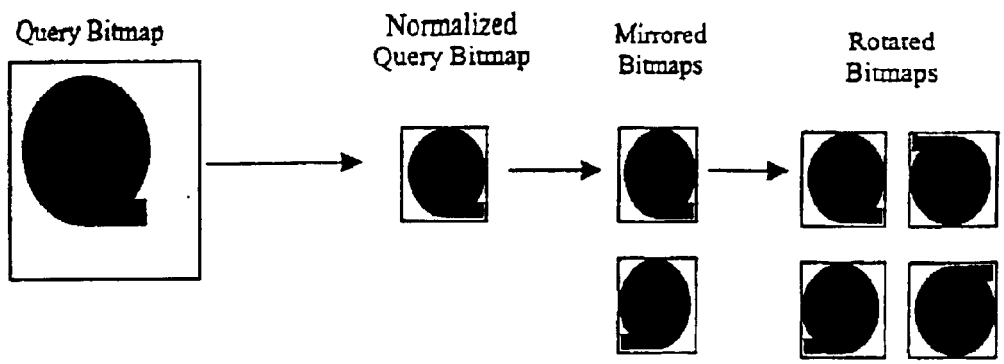
Figure 9 Generation of 4 versions of query shape
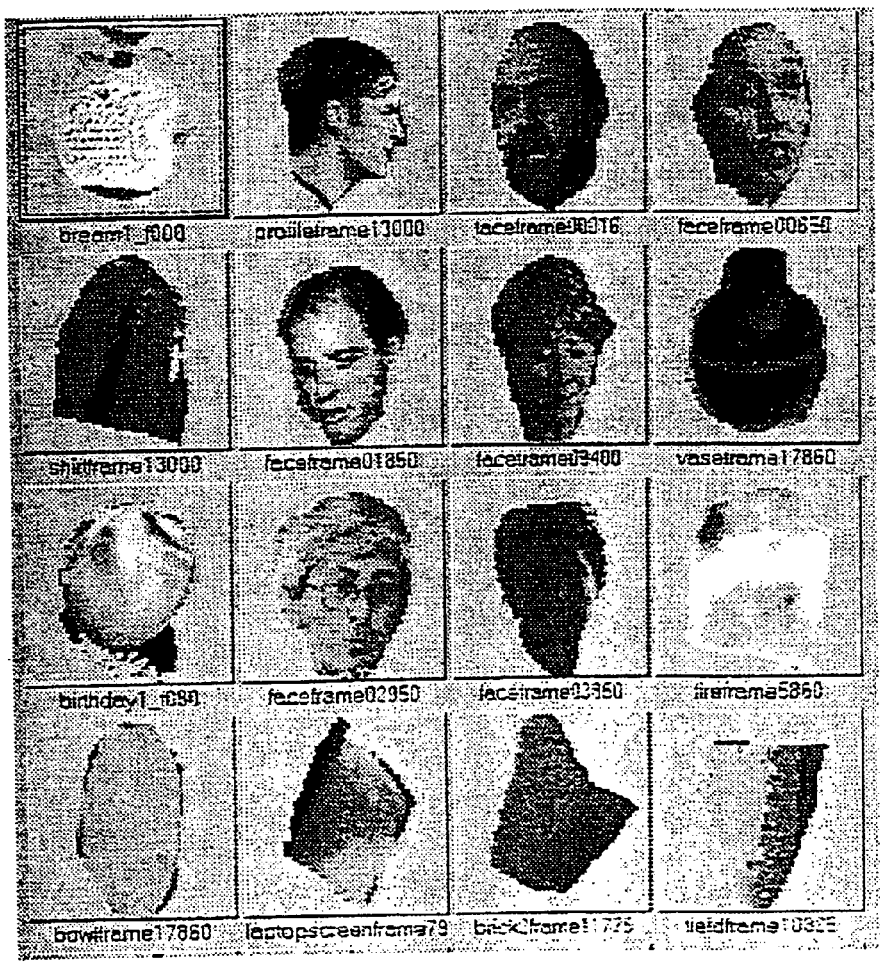
Figure 10 Query shape is the top-left bitmap. Rest are the results from a query for similar shapes.

NORMALIZED BITMAP REPRESENTATION OF VISUAL OBJECT'S SHAPE FOR SEARCH/QUERY/FILTERING APPLICATIONS

CROSS REFERENCE TO RELATED APPLICATIONS

This is a continuation of provisional U.S. patent application Ser. No. 60/118,207 filed Feb. 1, 1999, now abandoned.

BACKGROUND OF THE INVENTION

The present invention relates to video data processing, and more particularly to a normalized bitmap representation of a visual object's shape for search/query/filtering applications.

With the success of the Internet, and picture and video coding standards such as JPEG, MPEG-1, 2, more and more audio-visual information is available in digital form. Before one can use any such information, however, it first has to be located. Searching for textual information is an established technology. Many text-based search engines are available on the World Wide Web to search text documents. Searching is not yet possible for audio-visual content, since no generally recognized description of this material exists. MPEG-7 is intended to standardize the description of such content. This description is intended to be useful in performing search at a very high level or at a low level. At a high level the search may be to locate "a person wearing a white shirt walking behind a person wearing red sweater". At lower levels for still images the search may use characteristics like color, texture and information about the shape of objects in the picture. The high level queries may be mapped to the low-level primitive queries to perform the search.

Visual object searches are useful in content creation, such as to locate from archive the footage from a particular event, e.g. a tanker on fire, clips containing particular public figure, etc. Also the number of digital broadcast channels is increasing every day. One search/filtering application is to be able to select the broadcast channel (radio or TV) that is potentially interesting.

What is desired is a descriptor that may be automatically or semi-automatically extracted from still images/key images of video and be used in searches.

BRIEF SUMMARY OF THE INVENTION

Accordingly the present invention provides a normalized bitmap representation of a visual object's shape for search/query/filtering applications that is easy to compute, but answers a variety of queries. An image is segmented into visual objects, and the samples belonging to one of the visual objects of interest are identified and grouped into the largest connected blob as an un-normalized bitmap. The un-normalized bitmap is normalized with respect to translation, rotation and scale by estimating the mean and covariance of the samples and back projecting the un-normalized bitmap as a function of the mean and a principal direction to produce a normalized bitmap representation having a standard height and oriented so the principal direction is along a vertical direction. Once all visual objects in an image database have associated normalized bitmap representations, a query bitmap may be used to identify those visual objects from the database that have a desired shape, aspect ratio or sample density.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is an illustrative view of a visual object with its binding box according to the present invention.

FIG. 2 is an illustrative view of a bitmap representing the object shape of FIG. 1.

FIG. 3 is an illustrative view of an unnormalized bitmap.

FIG. 4 is an illustrative view of a normalized bitmap according to the present invention.

FIG. 5 is a block diagram view of an overall normalized bitmap generation according to the present invention.

FIG. 6 is a block diagram view of a bitmap normalization process according to the present invention.

FIG. 7 is a block diagram view of a search engine based on normalized bitmap representation of shape according to the present invention.

FIG. 8 is an illustrative view of a mismatch measure according to the present invention.

FIG. 9 is an illustrative view of the generation of four versions of a query shape according to the present invention.

FIG. 10 is an illustrative view of the results from a query for similar shapes according to the present invention.

DETAILED DESCRIPTION OF THE INVENTION

A normalized bitmap representation of a visual object's shape may be used for searching based on the shape of the object. This representation is easy to compute, but answers a variety of queries that are described later. This representation provides a high quality shape representation. However, this representation has somewhat larger memory requirements compared to the simple binding box representation, described co-pending provisional U.S. patent application Ser. No. 60/118,386 entitled "Coarse representation of visual object's shape for search/query/filtering applications". Loss-less bitmap compression methods, such as arithmetic coding, may be used to minimize the memory requirements. Use of lossy compression methods results in further reductions in memory requirements, with very little loss in search performance. The bitmap representation is more complete than the contour-based representation of the visual object shape, in the sense that it can easily account for "holes" in the shape.

This method may be used for visual objects in still images or in video. A bitmap is a matrix of numbers, as shown in FIG. 2, whose dimensions are at least that of a binding box encompassing the visual object of interest in an image, and may go up to the dimensions of the image itself. A value of "1", at a position in this bitmap is an indication that the particular pixel belongs to the object. The binding box of the visual object is the tightest rectangle that fully encompasses that visual object in the image, as shown in FIG. 1. In general each semantic object, or its sub-portions, may be represented by a bitmap whose values are defined inside a binding box (a rectangle) in the image.

A generic bitmap representation of the shape is not a suitable format for matching needed in servicing queries. For example, the resolution of a video capture device dictates the number of samples of the bitmap that represent the object. If a standard definition camera captures a given tree, the number of samples contained in the bitmap is lower than what would be contained if an HDTV camera were used. In addition, the orientation of the camera, the zoom parameters and the spatial positioning of the tree within the picture affect the bitmap. In all these situations, the visual object is the same, and a search for objects of that shape is desired. In order to neutralize all these capture-time variables, a normalized bitmap representation is used for shape, which more easily matches with a query shape.

The normalized bitmap representation of the shape enables resolution, orientation, location, and flip agnostic match of two shapes. The following describes the normalization process for the bitmap and the matching process to determine the "closeness" or "mismatch" between two given shapes. This mismatch measure may be used to extract best matches from a database of visual object shapes. FIG. 3 shows an unnormalized bitmap. FIG. 4 shows the corresponding normalized bitmap.

The steps involved in the generation of a normalized bitmap are (1) segmentation, (2) extraction of un-normalized bitmap, and finally (3) normalization of the bitmap. These stages are cascaded, as shown in FIG. 5. In this figure, the segmentation process may either be automatic, semi-automatic, or manual. The segmentation map consists of segmentation labels at each pixel. The set of pixels having a particular segmentation label belongs to a distinct visual object. Thus, the second stage merely creates a binary map, with values "valid" (true, 1, or 255) wherever segmentation label equals the objectID of interest, and "invalid" (false, or 0) elsewhere. Identification of the largest connected region in the bitmap is covered in co-pending provisional U.S. patent applications Ser. Nos. 60/118,192 and 60/118,208 covering extraction of homeneous regions based on texture or color.

The bitmap normalization is performed in two stages, as shown in FIG. 6. In the estimation of translation and rotation, the mean and covariance of the "positions" of valid samples in the un-normalized bitmap are estimated. The following psuedo code segment illustrates this process.

```
// To figure out translation and rotation parameters
double tmph, tmpv, tmp, sum;
// Mean is initialized with dimension 2, values 0
Vector<double>mean[2];
// Covariance is initialized with dimension 2x2, values 0
Matrix<double>covar(2, 2);
/* Find mean and covariance of this un-normalized
    bitmap valid coordinates.
*/
for (i = 0; i < inputBitmapHeight; i++) {
    for (j = 0; j < inputBitmapWidth; j++) {
        if (inputBitmap[i][j] is valid) {
            nSamples++;
            tmph = double(j);
            tmpv = double(i);
            mean[0] += tmpv;
            mean[1] += tmph;
            covar[0][0] += (tmpv*tmpv);
            covar[1][1] += (tmph*tmph);
            covar[0][1] += (tmph*tmpv);
        }
    }
}
if (nSamples < 1) {
    Input bitmap is completely invalid;
    Early exit;
}
covar[1][0] = covar[0][1];
mean = (1.0/nSamples) * mean;
covar = (1.0/nSamples) * covar;
covar = covar - mean * Transpose(mean);
```

Based on the mean and covariance estimated above, the principal direction of the input bitmap is computed through Karhunen-Loéve transformation (KLT) of the covariance matrix ("Numerical recipes in C," Press, Teukolsky, Vetterling, and Flannery, Cambridge University Press, 1992). These directions are available as the eigenvectors of the covariance matrix. Once the eigenvectors of the covariance matrix are computed, they are sorted such that the first column of the eigenvector matrix is the dominant eigenvector.

A back-projection process takes as input the mean and eigenvectors computed from the preceding process, and performs the actual normalization of the input bitmap for translation, rotation and scale. After normalization, all bitmaps have a standard height (normalizedHeight), and the bitmaps are oriented such that the principal direction (corresponding to the dominant eigenvector) is along the vertical direction. There are two stages to this back-projection process.

The height of all normalized bitmaps (normalizedHeight) in the database is fixed to a pre-determined quantity. Another way to perform this normalization is to fix the width of all normalized bitmaps. In this implementation, the height is normalized to 65 rows. The width of the normalized bitmap is determined to maintain the aspect ratio identical to the source (i.e. un-normalized bitmap). This is achieved through the following psuedo-code segment, where the bounding box width and height is computed along the new co-ordinate axes.

```
// determine the dimensions upon normalization
tmp = double(inputBitmapWidth+inputBitmapHeight);
double minNewVer = tmp;
double maxNewVer = -tmp;
double minNewHor = tmp;
double maxNewHor = -tmp;
for (i = 0; i < inputBitmapHeight; i++) {
    for (j = 0; j < inputBitmapWidth; j++) {
        if (inputBitmap[i][j] is valid) {
            tmp = (i - mean[0]) * eigvec[0][0]+
                (j - mean[1]) * eigvec[1][0];
            minNewVer = (minNewVer > tmp) ? tmp : minNewVer;
            maxNewVer = (maxNewVer < tmp) ? tmp : maxNewVer;
            tmp = (i - mean[0]) * eigvec[0][1] +
                (j = mean[1]) * eigvec[1][1];
            minNewHor = (minNewHor > tmp) ? tmp : minNewHor;
            maxNewHor = (maxNewHor < tmp) ? tmp : maxNewHor;
        }
    }
}
i = ⌈(maxNewVer+0.5)⌉;
j = ⌈(minNewVer-0.5)⌉;
i = (i > j) ? i+i+1 : j+j+1;
double scaleFactor = normalizedHeight/double(i);
i = ⌈(maxNewHor)⌉;
j = ⌊(minNewHor)⌋;
i=(i > j) ? i+i+1 : j+j+1;
int normalizedWidth = ⌈(scaleFactor * i)⌉;
// make the output width odd
if (normalizedWidth%2 == 0) normalizedWidth++;
// The normalized bitmap has dimensions normalizedHeight
// and normalizedWidth.
// Fill outputBitmap by back-projection
int shiftRow = (normalizedHeight-1)/2;
```

-continued

```
int shiftCol = (normalizedWidth-1)/2;
int intv, inth;
scaleFactor = 1.0/scaleFactor;
eigvec = eigvec * scaleFactor;
for (i = 0; i < normalizedHeight; i++) {
    for (j = 0; j < normalizedWidth; j++) {
        /* Find out what pixel position [i, j] in the
           outputBitmap maps to in the inputBitmap
           co-ordinate system (tmph, tmpv) */
        tmpv = (i – shiftRow) * eigvec[0][0] +
            (j – shiftCol) * eigvec[0][1] +mean[0];
        tmph = (i – shiftRow) * eigvec[1][0] +
            (j – shiftCol) * eigvec[1][1] + mean[1];
        // tmph and tmpv are in sub-pixel accurate positions
        intv = int(tmpv); // full pixel resolution
        inth = int(tmph);
        if (coordinate (intv, inth) and its neighbors are inside
inputBitmap boundary) {
            tmp = bilinearInterpolate(inputBitmap, tmph, tmpv);
            if(tmp > 64) outputBitmap[i][j] = 255;
        } // otherwise, 0
    }
}
```

In addition to the following queries served by the simple "Coarse Shape (Binding Box) Representation", the normalized bitmap representation of a visual object helps in serving the query "which visual objects have a shape resembling this shape". Queries served by both Coarse Shape Representation and the Normalized bitmap representations:
1. Find the visual objects that have a particular aspect ratio (ratio of height to width).
2. Find the visual objects that are at least x % (a given percentage) dense.
3. Find the visual objects that are at most x % (a given percentage) dense.

Once the feature vectors (i.e. normalized bitmaps) are available for each visual object in each image of the database, it is possible to perform the matching based on the queries listed above, using the search engine depicted in FIG. 7.

The user provides a query bitmap, and asks for similarly shaped visual objects from the database. For the purpose of finding similarly shaped objects, a mismatch metric "M" between two normalized bitmaps is defined as the total number of positions where the two disagree. As an example, the mismatch measure M(A,Q) between two normalized bitmaps A and Q in FIG. 8 is the number of samples in the shaded area. Note in this figure that the centers of triangles are aligned and heights of the normalized bitmaps are identical.

The search engine uses the following steps to serve this request.
1. Normalize the query bitmap.
2. Obtain two mirror versions of the normalized query bitmap.
3. Obtain 180° rotated versions of the two mirror versions, for a total of four normalized query bitmaps, say $Q_i$, I=0, 1, 2 or 3. An example of these four versions is shown in FIG. 9.
4. For each normalized bitmap $A_j$ in the database, compute the best mismatch value with the query bitmap: $d(A_j,Q)= \min_{i=0.0} M(A_j,Q_i)$.
5. Identify the indices j's with low values of $d(A_j,Q)$. These indices give the best matches for the queried shape.

FIG. 10 shows a query shape and the results from a query for similar shapes.

The user provides a query bitmap (draws a shape), or enters a number (the query aspect ratio) and asks for visual objects with similar aspect ratio. The search engine uses the following steps to serve this request.
1. Normalize the query bitmap Q. Compute the aspect ratio q (height divided by width) of the normalized bitmap.
2. For each normalized bitmap $A_1$ in the database, compute the aspect ratio $a_j$ and the absolute difference between q and $a_j$, $d_j=|a_j-q|$.
3. Identify the indices j's with low values of $d_j$. These indices give the best matches for the queried aspect ratio.

The user provides a query bitmap and asks for visual objects with similar density of valid samples. The density is the fractional number of valid samples in a bitmap. The search engine uses the following steps to serve this request.
1. Given a query bitmap Q, compute the density of valid samples, "q".
2. For each normalized bitmap $A_j$ in the database, compute the density $a_j$ and the absolute difference between q and $a_j$, $d_j=|a_j-q|$.
3. Identify the indices j's with low values of $d_j$. These indices give the best matches for the queried density of valid samples.

Thus the present invention provides a normalized bitmap representation of a visual object's shape for search/query/filtering applications estimating the mean and covariance of the positions of valid samples in an unnormalized bitmap, and computing the bitmap from the covariance matrix.

What is claimed is:

1. A method of generating a normalized bitmap representation of the shape of a visual object in an image comprising the steps of:
   segmenting the image to generate a segmentation map of visual objects;
   identifying samples from the segmentation map belonging to a visual object of interest;
   identifying the largest connected blob to form an un-normalized bitmap; and
   normalizing the un-normalized bitmap to form a normalized bitmap representation, wherein said normalizing step additionally comprises the steps of:
     estimating a mean and covariance for each valid sample in the un-normalized bitmap;
     computing a principal direction for the un-normalized bitmap based upon the mean and covariance as eigenvectors of a covariance matrix; and
     back projecting the un-normalized bitmap as a function of the mean and eigenvectors to normalize the un-normalized bitmap for translation, rotation and scale so that after normalization the normalized bitmap representation has a standard height and is oriented such that the principal direction is along a vertical direction.

2. The method as recited in claim 1 further comprising the step of searching a database of images, each image having associated visual objects with normalized bitmap representations, in response to a query specifying a desired normalized bitmap representation to identify a plurality of visual objects having normalized bitmap representations that closely match the desired normalized bitmap representation.

3. The method as recited in claim 2 wherein the searching step comprises the steps of:
   providing a query bitmap seeking similarly shaped visual objects from the database;
   normalizing the query bitmap;
   obtaining various mirror versions of the normalized query bitmap;
   for each normalized bitmap representation in the database compute a mismatch value with the normalized query bitmap; and identifying the visual objects having normalized bitmap representations with low mismatch values.

4. The method as recited in claim 2 wherein the searching step comprises the steps of:

providing a query bitmap to find visual object in the database having a similar aspect ratio;

normalizing the query bitmap;

computing a query aspect ratio for the normalized query bitmap;

computing an aspect ratio for each normalized bitmap representation in the database;

obtaining an absolute difference between the aspect ratios for each normalized bitmap representation and the query aspect ratio; and identifying the visual objects where the absolute difference has low values.

5. The method as recited in claim 2 wherein the searching step comprises the steps of:

providing a query bitmap to find visual objects with a similar density of valid samples;

computing a query density of valid samples for the query bitmap;

computing a density for each normalized bitmap representation in the database;

obtaining an absolute difference between the density for each normalized bitmap representation and the query density; and identifying the visual object where the absolute difference is low.

* * * * *